United States Patent [19]
Yokota

[11] Patent Number: 5,557,432
[45] Date of Patent: Sep. 17, 1996

[54] DISPLAY DEVICE AND IMAGE FORMATION APPARATUS HAVING FIRST AND SECOND LENS ARRAYS

[75] Inventor: Hideo Yokota, Yokohama, Japan

[73] Assignee: Canon Kabushiki Kaisha, Tokyo, Japan

[21] Appl. No.: 234,956

[22] Filed: Apr. 28, 1994

[30] Foreign Application Priority Data

Apr. 30, 1993 [JP] Japan ................................. 5-128212

[51] Int. Cl.[6] ............................................... G02F 1/1335
[52] U.S. Cl. ............................................................ 359/41
[58] Field of Search ............................... 359/40, 41, 62

[56] References Cited

U.S. PATENT DOCUMENTS

| | | | |
|---|---|---|---|
| 4,365,869 | 12/1982 | Hareng et al. | 359/40 |
| 5,052,783 | 10/1991 | Hamada | 359/40 |
| 5,101,279 | 3/1992 | Kurematsu et al. | 358/241 |
| 5,187,599 | 2/1993 | Nakanishi et al. | 359/41 |
| 5,398,125 | 3/1995 | Willeti et al. | 359/40 |
| 5,455,694 | 10/1995 | Ariki et al. | 359/41 |

FOREIGN PATENT DOCUMENTS

| | | | |
|---|---|---|---|
| 0534426 | 3/1993 | European Pat. Off. . | |
| 2115889 | 4/1990 | Japan . | |
| 2262185 | 10/1990 | Japan . | |
| 2279171 | 12/1994 | United Kingdom | 359/40 |

*Primary Examiner*—Anita Pellman Gross
*Assistant Examiner*—James A. Dudek
*Attorney, Agent, or Firm*—Fitzpatrick, Cella, Harper & Scinto

[57] ABSTRACT

A display device includes a plurality of light modulation portions, a first lens array having lens portions corresponding to the plurality of light modulation portions to converge incident light by the lens portions, and a second lens array having lens portions corresponding to each of the lens portions of the first lens array. The second lens array received light from the first lens array and is arranged at a converging point position of the first lens array.

14 Claims, 5 Drawing Sheets

DISPLAY DEVICE AND IMAGE FORMATION APPARATUS HAVING FIRST AND SECOND LENS ARRAYS

BACKGROUND OF THE INVENTION

1. Field of the Invention

The present invention relates to a display device and an image formation apparatus and, more particularly, to a display device such as a liquid crystal display device which generates an image by modulating incident light for each pixel of the device and an image formation apparatus comprising the display device.

2. Related Background Art

In order to improve the contrast of a displayed image, a technique for improving the vignetting factor of a liquid crystal device by arranging a micro-lens array in front of (on the light incidence side of) the liquid crystal display device, is known.

However, since this technique makes the spread of light output from the liquid crystal display device wider, when a display image is to be projected using this output light, the dimensions of a projection lens system undesirably become greater.

SUMMARY OF THE INVENTION

The present invention has been made in consideration of the above-mentioned problems, and has as its object to provide an improved display device and image formation apparatus.

A light modulation device according to the present invention comprises a light modulation portion, a first lens, having a lens portion corresponding to the light modulation portion to converge incident light by the lens portion, and a second lens, having a lens portion corresponding to the lens portion of the first lens, for receiving a light from the first lens, and arranged at a position at a converging point position of the first lens.

Another light modulation device according to the present invention comprises a light modulation portion, a first lens, having a lens portion corresponding to each of the light modulation portion to converge incident light by the each lens portion, and directing the light to the light modulation portion, and a second lens, having a lens portion corresponding to the lens portion of the first lens, and arranged at a position at a converging point position of the first lens, the lens portion of the second lens receiving light from the light modulation portion.

Each of a display device and image formation apparatus according to the present invention comprises a plurality of light modulation portions, a first lens array, having lens portions corresponding to each of the light modulation portions to converge incident light by the lens portions, and a second lens array having lens portions corresponding to the lens portions of the first lens array, for receiving a light from said first lens array and arranged at a converging point position of the first lens array.

Each of another display device and image formation apparatus according to the present invention comprises a plurality of light modulation portions, a first lens array, having lens portions corresponding to the light modulation portions to converge incident light by the lens portions and directing the light to each of the light modulation portions, and a second lens array having lens portions corresponding to the lens portions of the first lens array, and arranged at a position at the converging point position of the first lens array, the lens portions of the second lens array receiving light from the corresponding light modulation portions.

A liquid crystal projector according to the present invention comprises a liquid crystal device having a plurality of light modulation portions, a first lens array, having lens portions corresponding to each of the light modulation portions to converge incident light by each of the lens portions, a second lens array having lens portions corresponding to each of the lens portions of the first lens array, for receiving a light from the first lens array, and arranged at the converging point position of the first lens array, and a projection optical system for receiving light from the second lens array.

Another liquid crystal projector according to the present invention comprises a liquid crystal device having a plurality of light modulation portions, a first lens array, having lens portions corresponding to each of the light modulation portions to converge incident light by each of the lens portions and directing the light to each of the light modulation portions, a second lens array having lens portions corresponding to each of the lens portions of the first lens array, and arranged at the converging point position of the first lens array, each of the lens portions of the second lens array receiving light from the respectively corresponding light modulation portions, and a projection optical system for receiving light from the second lens array.

According to a preferable aspect of the present invention, the focal length of the second lens array is set to be substantially equal to the distance between the first and second lens arrays.

DETAILED DESCRIPTION OF THE PREFERRED EMBODIMENTS

Figure 1:
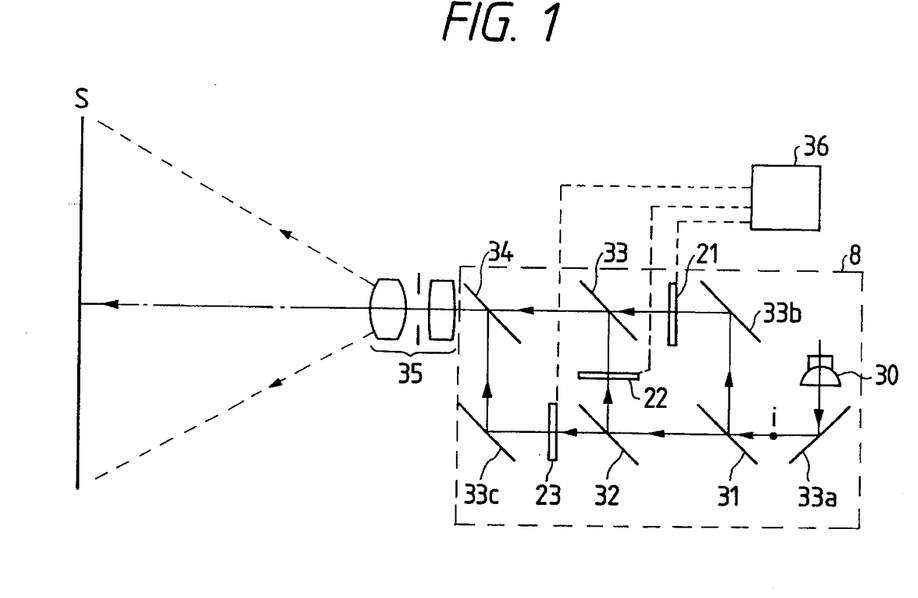
FIG. 1 is a schematic diagram showing main part of he first embodiment of a projection apparatus using a display device of the present invention.

FIG. 1 is a schematic view showing the main part of the first embodiment of a projection apparatus using a display device according to the present invention.

In the first embodiment shown in FIG. 1, the display device of the present invention is applied to a color liquid crystal projector for projecting a color image formed by liquid crystal light valves.

Referring to FIG. 1, a white light source unit 30 outputs a collimated light beam. Display devices 21, 22, and 23 respectively use red, green, and blue liquid crystal display devices (liquid crystal light valves). Each of the display devices 21, 22, and 23 comprises a plurality of pixels whose transmittances or reflectances with respect to incident light change in accordance with a control signal from a control means 36. Each of the display devices 21, 22, and 23 modulates light from the light source unit 30, and forms an image of a corresponding color.

The liquid crystal light valve is provided with construction wherein a plurality of pixels are arranged by a matrix manner. The liquid crystal projector includes reflection mirrors 33a, 33b, and 33c. A red reflection dichroic mirror 31 reflects red light, and illuminates the red display device 21 with the red light. Green reflection dichroic mirrors 32 and 33 illuminate the green display device 22 with a green light and reflect the light from the display device 22.

The blue display device 23 is illuminated with blue light having passed through the red reflection dichroic mirror 31 and the green reflection dichroic mirror 32. The liquid crystal projector also includes a blue reflection dichroic mirror 34. The light source 30, the reflection mirrors 33a and 33b, the dichroic mirrors 31 and 32, and the like constitute one element of illumination means.

Referring to FIG. 1, white light from the white light source unit 30 is color-separated into red, green, and blue color light components by the dichroic mirrors (31 and 32), and the corresponding red, green, and blue display devices (21, 22, and 23) are respectively illuminated with each of these red, green, and blue light components. Color images respectively formed by the display devices (21, 22, and 23) based on each of these color light components are projected onto the surface of a screen S by a projection optical system 35 to overlap each other, thus obtaining a full-color image on the screen S.

Figure 2:
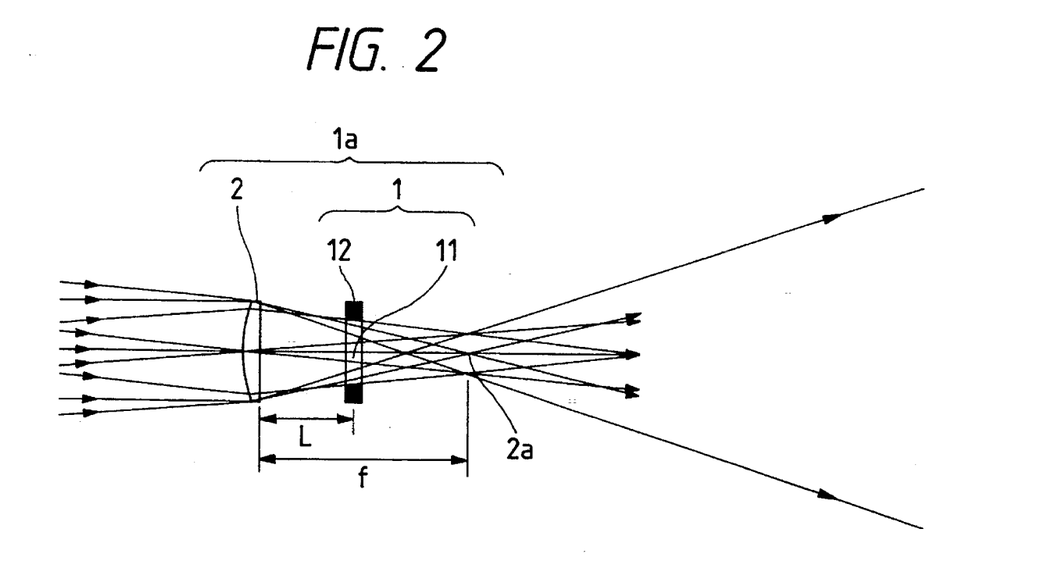
FIG. 2 is a partial explanatory view of the first embodiment of the display device of the present invention.

FIG. 2 is an explanatory view of the display devices 21, 22, and 23 used in FIG. 1. FIG. 2 illustrates a portion near one of the plurality of pixels constituting each display device.

FIG. 2 shows one pixel 1 of a plurality of pixels constituting the liquid crystal light valve, and the arrangements of other pixels are the same as that of this pixel. The pixel 1 has an aperture portion 11 for transmitting light, and a light-shielding portion 12 for shielding light. A converging member 2 is arranged at each of pixels to converge illumination light. The converging member 2 comprises, e.g., a plano-convex lens, a Fresnel lens, a diffraction grating, a plane-parallel plate and the like having a refractive index distribution from an axis perpendicular to its surface in the radial direction, or the like. FIG. 2 shows a case wherein the converging member 2 comprises a plano-convex lens.

In this embodiment, a plurality of pixels 1 shown in FIG. 2 are arranged by a matrix manner to constitute the display device. The converging members 2 are opposedly arranged, whereby first converging means is constituted. One pixel 1 and one converging member 2 constitute one pixel unit 1a.

In this embodiment, each display device is constituted by the liquid crystal light valve and the first converging means like the above-mentioned arrangement.

In this embodiment, if the distance from the lens 2 to a focal point 2a of collimated light by the lens 2 (i.e., the focal length of the lens 2) is represented by f, and the distance from the rear surface of the lens 2 to the center of the pixel 1 is represented by L, as shown in FIG. 2, the respective elements are set to satisfy:

$$1.3 < f/L < 2.5 \tag{1}$$

With this arrangement, since illumination light of the liquid crystal light valve passes through the aperture portion 11 of the pixel 1, and is converged at the focal point 2a, the divergence angle of a light beam emerging from the pixel 1 can be about half that of light which is converged on the pixel, thus effectively utilizing a light beam.

Figure 3:
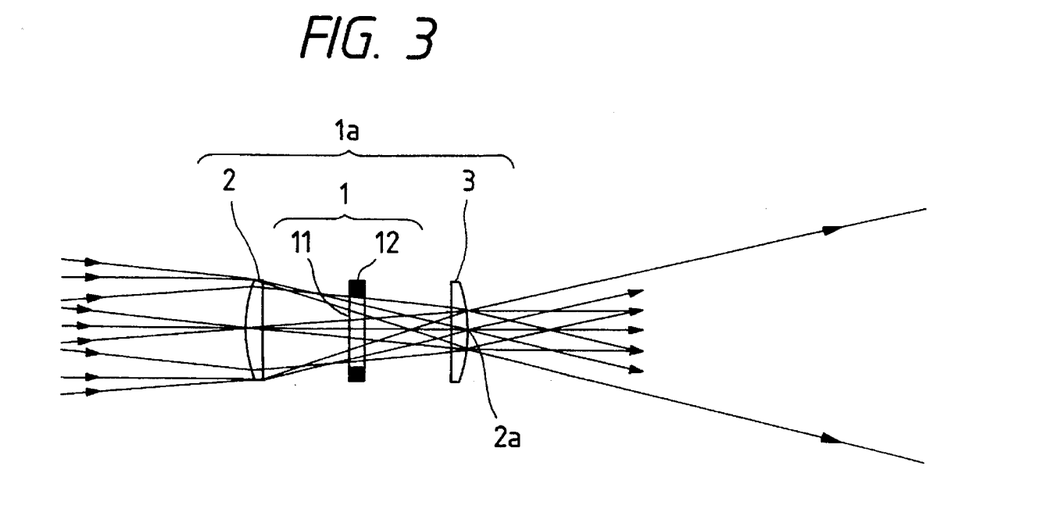
FIG. 3 is a partial explanatory view of the second embodiment of the display device of the present invention.

FIG. 3 is an explanatory view showing the second embodiment of the display devices 21, 22, and 23 of the present invention. FIG. 3 illustrates a portion near one of the plurality of pixels constituting each display device as in FIG. 2.

In this embodiment, a converging member 3 is arranged at the output side of a pixel 1 in correspondence with each of the plurality of pixels, thus constituting second converging means.

The converging member 3 controls the direction of a light beam emerging from the corresponding pixel 1 so as to decrease the spread angle of a light beam emerging from the pixel 1. In this embodiment, the converging member 3 comprises a plano-convex lens.

The converging member 3 is arranged near a converging point 2a of a converging member 2, and the refracting powers of the respective elements are set, so that the focal point position of the converging member 3 is located near the converging member 2. The pixel 1, the converging member 2, and the converging member 3 constitute a single pixel unit 1a.

In this embodiment, the first and second converging means may be constituted by adhering them with the liquid crystal light valve. Also, the first and second converging means may be constituted by lenses having the same shape.

Furthermore, a polarization filter, a phase filter, a color filter, and the like may be arranged between the first converging means and the liquid crystal light valve or between the second converging means and the liquid crystal light valve.

Figure 4:
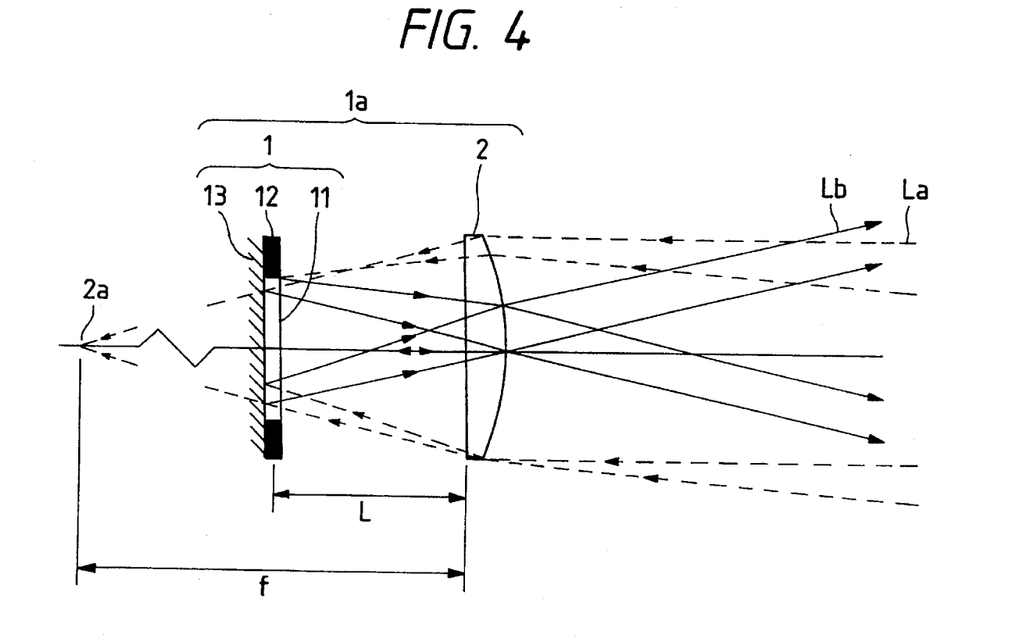
FIG. 4 is a partial explanatory view of the third embodiment of the display device of the present invention.

FIG. 4 is an explanatory view showing the third embodiment of the display devices 21, 22, and 23 of the present invention. FIG. 4 illustrates a portion near one of the plurality of pixels constituting each display device.

In this embodiment, a reflection type liquid crystal light valve is used in place of the transmission type liquid crystal light valve of the first embodiment shown in FIG. 2, and other arrangements are the same as those in the first embodiment.

Referring to FIG. 4, a reflection portion 13 is arranged in correspondence with each pixel 1. A light beam La indicated by a dotted line is illumination light from the light source, and a light beam Lb indicated by a solid line is a light beam which is reflected by the reflection portion 13 of the light valve 1 and has image information.

The distance f from a lens 2 to its focal point 2a and the distance L from the lens 2 to the center of the pixel 1 are set to satisfy the above-mentioned formula (1).

Figure 5:
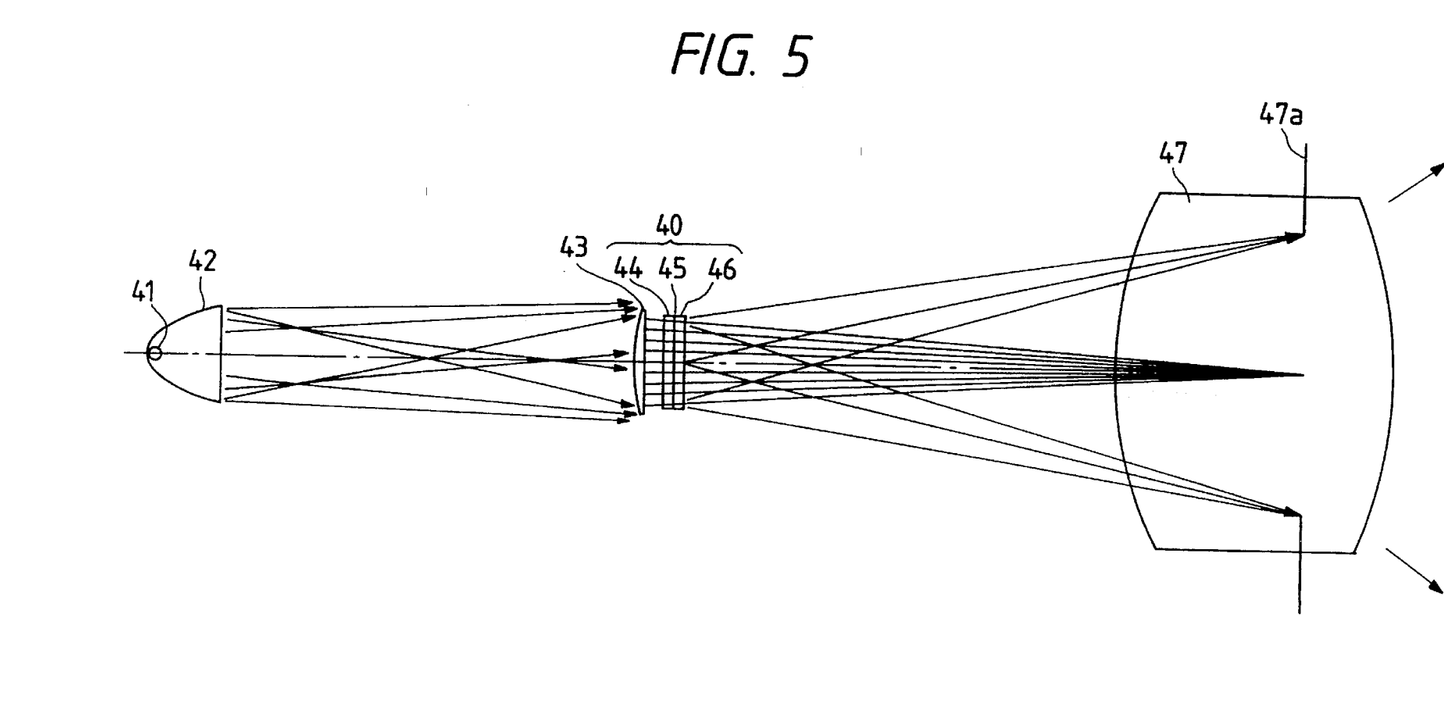
FIG. 5 is a schematic diagram showing the main part of the second embodiment of a projection apparatus using the display device of the present invention.

FIG. 5 is a schematic view showing main part of the second embodiment of a projection apparatus using the display device of the present invention. A display device 40 of this embodiment is constituted by arranging a plurality of pixel units 1a shown in FIG. 3 by a matrix manner, as shown in FIG. 6.

Referring to FIG. 5, a white light source 41 comprises, e.g., a metal halide lamp, and a reflection mirror 42 comprises, e.g., a cold mirror with a parabolic surface, and reflects a light beam from the white light source 41. A condenser lens 43 efficiently guides illumination light from the white light source 41 toward the display device 40. The display device 40 is constituted by a first converging means 44 having a plurality of converging members, a liquid crystal light valve 45 having a plurality of pixels, and a second converging means 46 having a plurality of converging members, as shown in FIG. 6. The positional relationship between each of the converging members and pixels are as shown in FIG. 3.

Referring to FIG. 5, a projection optical system 47 projects image information formed by the display device 40 onto the surface of a screen (not shown). The projection optical system 47 has an entrance pupil 47a. An image of the white light source 41 is converged on the entrance pupil 47a via the condenser lens 43 and the display device 40.

Figure 6:
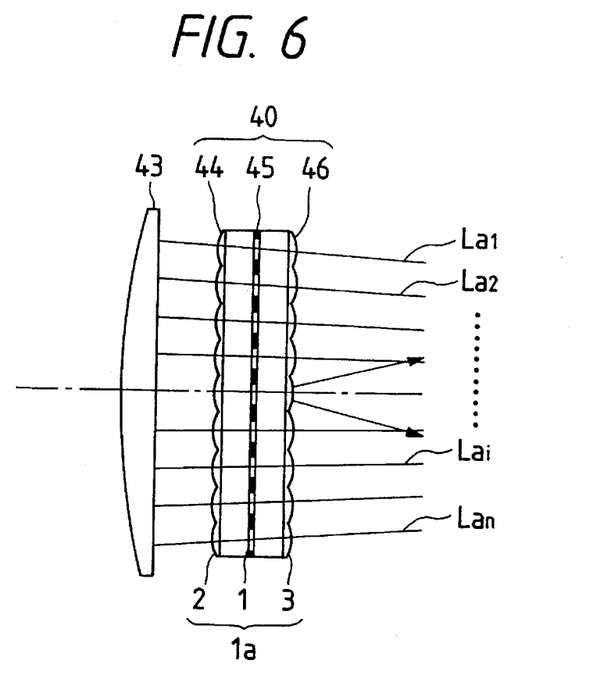
FIG. 6 is an explanatory view of the display device shown in FIG. 5.

The respective elements of the display device 40 are constituted, so that lines $La_i$ (i=1 to n) connecting the center of each of the aperture portions of the pixels and the center of the entrance pupil 47a of the projection optical system 47 pass the center of each of the lenses of the first converging means 44 and that of each of the lenses of the second converging means 46, as shown in FIG. 6.

Though this arrangement, a light beam from the liquid crystal light valve 45 is efficiently converged on the entrance pupil 47a of the projection optical system 47, so that light beams outgoing from each of the pixels overlap each other on the entrance pupil 47a.

In this embodiment, a polarization filter or a phase filter may be arranged between the first converging means 44 and the liquid crystal light valve 45 or between the second converging means 46 and the liquid crystal light valve 45.

Also, R, G, and B color filters may be arranged to project a color image. Three combinations of condenser lenses 43 and display devices 40 may be arranged at the positions of the display devices 21, 22, and 23 in FIG. 1 to project a color image.

Figure 7:
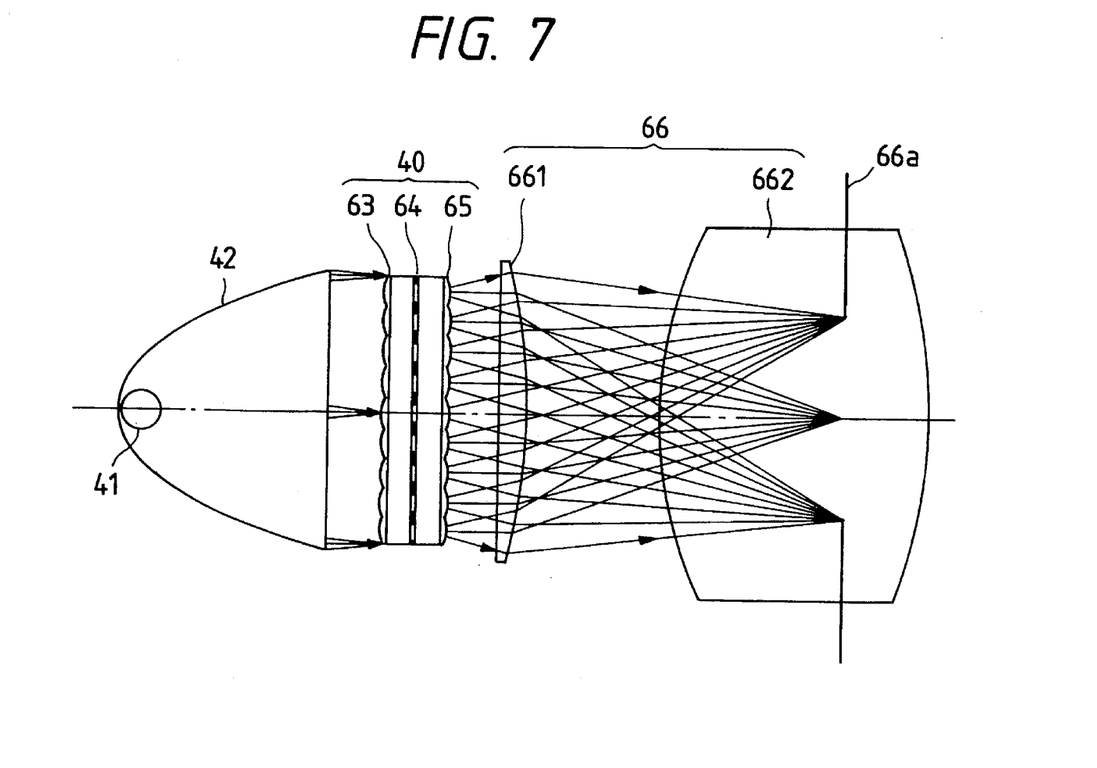
FIG. 7 is a schematic diagram showing the main part of the third embodiment of a projection apparatus using the display device of the present invention.

FIG. 7 is a schematic view showing the main part of the third embodiment of a projection apparatus using the display device of the present invention.

Referring to FIG. 7, a first converging means 63, a liquid crystal light valve 64, and a second converging means 65 constitute a display device 40. This arrangement is substantially the same as that shown in FIG. 6. Lenses 661 and 662 constitute one portion of projection optical system 66.

In this embodiment, the light incidence side of the projection optical system 66 is telecentric, so that an entrance pupil 66a of the projection optical system 66 is located at the infinity position. Thus, the first and second converging means 63 and 65 are symmetrical with respect to the liquid crystal light valve 64. Other arrangements are the same as those in the second embodiment shown in FIG. 5.

Figure 8:
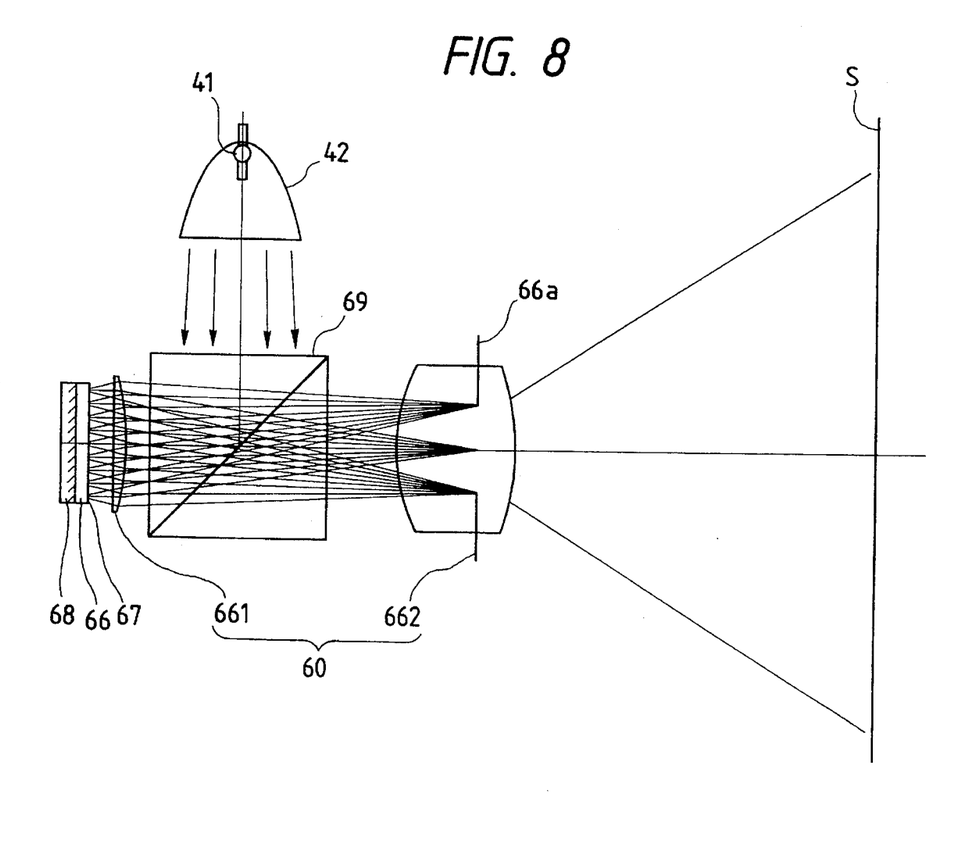
FIG. 8 is a schematic diagram showing the main part of the fourth embodiment of a projection apparatus using the display device of the present invention.

FIG. 8 is a schematic view showing the main part of the fourth embodiment of a projection apparatus using the display device of the present invention.

Referring to FIG. 8, a liquid crystal light valve 66, a converging means 67 and a reflection mirror 68 constitute a display device 40. The construction of each of pixels of this device 40 is the same as that shown in FIG. 4. A beam splitter 69 is disposed between a lens 661 and a lens 662 which constitute a projection optical system 60.

In this embodiment, the light incidence side of the projection optical system 66 is telecentric (the light exit side of the device 40 is also telecentric).

A light beam from a white light source 41 is reflected by a reflection mirror 42 and then is re-reflected by a beam splitting surface of the beam splitter 69. The reflected light beam from the beam splitter 69 illuminates the display device 40.

A light beam from the display device 40, which indicate an image is passes through lens 661, beam splitter 69 and lens 662, and is projected onto a screen S.

What is claimed is:

1. A display device comprising:

a plurality of light modulation portions;

a first lens array having lens portions, corresponding to said plurality of light modulation portions, for converging a light by said lens portions; and a second lens array having lens portions corresponding to said lens portions of said first lens array, for receiving the light from said light modulation portions, and arranged at a converging point portion of said first lens array.

2. A display device comprising:

a plurality of light modulation portions;

a first lens array having lens portions corresponding to each of said plurality of light modulation portions for converging a light by each of said lens portions and directing the light to each of said light modulation portions; and a second lens array having lens portions corresponding to each of said lens portions of said first lens array, and arranged at a converging point position of said first lens array and each of said lens portions of said second lens array receiving light from said light modulation portions.

3. A device according to claim 2, wherein a focal length of said second lens array is set to be substantially equal to a distance between said first and second lens arrays.

4. A device according to claim 2, wherein said plurality of light modulation portions each comprise a liquid crystal light valve.

5. An image formation apparatus comprising:

a plurality of light modulation portions;

a first lens array having lens portions corresponding to each of said plurality of light modulation portions for converging a light by said lens portions; and a second lens array having lens portions corresponding to each of said lens portions of said first lens array for receiving the light from said first lens array, and arranged at a converging point position of said first lens array.

6. An image formation apparatus comprising:

a plurality of light modulation portions;

a first lens array having lens portions corresponding to each of said plurality of light modulation portions for converging a light by each of said lens portions and directing the light to each of said light modulation portions; and a second lens array, having lens portions corresponding to each of said lens portions of said first lens array, and arranged at a converging point position of said first lens array; and each of said lens portions of said second lens arrays receiving the light from said light modulation portions.

7. An apparatus according to claim 6, wherein a focal length of said second lens array is set to be substantially equal to a distance between said first and second lens arrays.

8. A liquid crystal projector comprising:

a liquid crystal element provided with a plurality of light modulation portions;

a first lens array having lens portions corresponding to each of said plurality of light modulation portions for converging a light by each of said lens portions;

a second lens array having lens portions corresponding to each of said lens portions of said first lens array, for receiving the light from said first lens array, and arranged at a converging point position of said first lens array; and a projection optical system for receiving light from said second lens array.

9. A liquid crystal projector comprising:

a liquid crystal device provided with a plurality of light modulation portions;

a first lens array having lens portions corresponding to each of said plurality of light modulation portions for converging a light by each of said lens portions and directing the light to said light modulation portions;

a second lens array having lens portions corresponding to each of said lens portions of said first lens array, and arranged at a converging point position of said first lens array, each of said lens portions of said second lens arrays receiving the light from said light modulation portions; and a projection optical system for receiving the light from said second lens array.

10. A projector according to claim 9, wherein a focal length of said second lens array is set to be substantially equal to a distance between said first and second lens arrays.

11. A light modulation device comprising:

a plurality of light modulation portions;

a first lens having lens portions corresponding to said light modulation portions for converging a light by said lens portions; and a second lens having lens portions corresponding to said lens portions of said first lens, for receiving the light from said first lens and arranged at a converging point position of said first lens.

12. A device according to claim 11, wherein a focal length of said second lens is set to be substantially equal to a distance between said first and second lens.

13. A light modulation device comprising:

a light modulation portion;

a first lens having a lens portion corresponding to said light modulation portion for converging a light by said lens portion, and for directing the light to said light modulation portion; and a second lens having a lens portion corresponding to said lens portion of said first lens, and arranged at a converging point position of said first lens, said lens portion of said second lens receiving the light from said light modulation portion.

14. A device according to claim 13, wherein a converging length of said second lens is set to be substantially equal to a distance between said first and second lenses.

* * * * *

UNITED STATES PATENT AND TRADEMARK OFFICE
CERTIFICATE OF CORRECTION

PATENT NO. : 5,557,432     Page 1 of 2
DATED : September 17, 1996
INVENTOR(S) : Yokota It is certified that error appears in the above-indentified patent and that said Letters Patent is hereby corrected as shown below:

Title page, item [57],

[57] ABSTRACT:

Line 7, "received" should read --receives--.

COLUMN 2:

Line 35, "main" should read --the main-- and "he" should read --the--.

COLUMN 5:

Line 66, "is" should be deleted.

COLUMN 6:

Line 9, "light modulation portions," should read --first lens array,--.
Line 10, "portion" should read --position--.
Line 53, "array; and" should read --array,--.
Line 54, "arrays" should read --array--.

COLUMN 7:

Line 17, "arrays" should read --array--.

UNITED STATES PATENT AND TRADEMARK OFFICE
CERTIFICATE OF CORRECTION

PATENT NO. : 5,557,432

DATED : September 17, 1996

INVENTOR(S) : Yokota

It is certified that error appears in the above-indentified patent and that said Letters Patent is hereby corrected as shown below:

COLUMN 8:

Line 22, "converging" should read --focal--.

Signed and Sealed this

Sixth Day of May, 1997

Attest:

Attesting Officer

BRUCE LEHMAN

Commissioner of Patents and Trademarks